United States Patent
Tariki

[19]

[11] Patent Number: 6,128,309
[45] Date of Patent: *Oct. 3, 2000

[54] CODE DIVISION MULTIPLEX COMMUNICATION APPARATUS

[75] Inventor: Motoi Tariki, Machida, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/766,337

[22] Filed: Dec. 16, 1996

[30] Foreign Application Priority Data

Jan. 10, 1996 [JP] Japan ..................... 8-002280

[51] Int. Cl.$^7$ ..................... H04J 13/02
[52] U.S. Cl. ............ 370/441; 375/200; 370/342
[58] Field of Search ................... 370/441, 342, 370/335, 347, 479; 375/206, 260, 200; 1/1; 340/825.69

[56] References Cited

U.S. PATENT DOCUMENTS

| | | | |
|---|---|---|---|
| 5,327,455 | 7/1994 | De Gaudenzi et al. ........... 375/200 X |
| 5,442,625 | 8/1995 | Gitlin ................................. 370/342 |
| 5,467,367 | 11/1995 | Izumi et al. ...................... 375/206 |
| 5,481,257 | 1/1996 | Brubaker ........................ 340/825.69 |
| 5,515,396 | 5/1996 | Dalekotzin ....................... 376/206 |
| 5,530,697 | 6/1996 | Watanabe ........................ 370/342 |
| 5,757,853 | 5/1998 | Tsujimoto ........................ 375/200 |
| 5,793,794 | 8/1998 | Kato et al. ....................... 375/200 |
| 5,796,774 | 8/1998 | Kato ................................. 375/206 |
| 5,799,010 | 8/1998 | Lomp et al. ..................... 370/335 |
| 5,805,583 | 9/1998 | Rakib ............................... 370/342 |
| 5,859,840 | 1/1999 | Tiedemann, Jr. et al. ....... 370/335 |
| 5,889,815 | 3/1999 | Iwakiri ........................ 375/208 X |

*Primary Examiner*—Edwin C. Holloway, III
*Attorney, Agent, or Firm*—Fitzpatrick, Cella, Harper & Scinto

[57] ABSTRACT

A communication apparatus is disclosed which allocates the respective bits indicating multilevel image data to different spread codes, and then spreads the bits by the use of the spread codes, thereby achieving code division multiplex communication. Image data consisting of 8 bits is transmitted and received at one time by the use of 8 or greater number of spreads codes. In the transmitting end, the amounts of the 8-bit luminance data and the 8-bit color difference data are halved along the time axis, and the resulting respective data are line-sequential multiplexed. Thus, among 12 fields, one field is transmitted according to the above-described code division multiplex method. In the receiving end, the receiving signal which has been code division multiplexed in the transmitting end is demodulated by de-spreading using a plurality of spread codes. The de-spread signal is stored in a memory and image data for one field is repeatedly read from the memory during 12 fields. Then, the luminance signal and the color difference signal are line-sequential separated from the read image data and are output.

37 Claims, 12 Drawing Sheets

FIG. 11

| PN62 | Y (7 : 1) | Y (0 : 7) | Y (0 : 13) | ... |
|---|---|---|---|---|
| 61 | B (7 : 1) | R (0 : 3) | B (0 : 7) | ... |
| 60 | Y (7 : 3) | Y (7 : 9) | Y (0 : 15) | ... |
| 59 | R (7 : 1) | B (7 : 5) | R (0 : 7) | ... |
| 58 | Y (7 : 5) | Y (7 : 11) | Y (7 : 17) | ... |
| 57 | B (7 : 3) | R (7 : 5) | B (7 : 9) | ... |
| 56 | Y (7 : 7) | Y (7 : 13) | Y (7 : 19) | ... |
| 55 | R (7 : 3) | B (7 : 7) | R (7 : 9) | ... |
| 54 | Y (6 : 1) | Y (7 : 15) | Y (7 : 21) | ... |
| 53 | B (6 : 1) | R (7 : 7) | B (7 : 11) | ... |
| 52 | Y (6 : 3) | Y (6 : 9) | Y (7 : 23) | ... |
| 51 | R (6 : 1) | B (6 : 5) | R (7 : 11) | ... |
| ⋮ | ⋮ | ⋮ | ⋮ | ... |
| ⋮ | ⋮ | ⋮ | ⋮ | ... |
| 14 | Y (1 : 1) | Y (2 : 15) | ⋮ | ... |
| 13 | B (1 : 1) | R (2 : 7) | ⋮ | ... |
| 12 | Y (1 : 3) | Y (1 : 9) | ⋮ | ... |
| 11 | R (1 : 1) | B (1 : 5) | ⋮ | ... |
| 10 | Y (1 : 5) | Y (1 : 11) | ⋮ | ... |
| 9 | B (1 : 3) | R (1 : 5) | ⋮ | ... |
| 8 | Y (1 : 7) | Y (1 : 13) | ⋮ | ... |
| 7 | R (1 : 3) | B (1 : 7) | ⋮ | ... |
| 6 | Y (0 : 1) | Y (1 : 15) | ⋮ | ... |
| 5 | B (0 : 1) | R (1 : 7) | ⋮ | ... |
| 4 | Y (0 : 3) | Y (0 : 9) | ⋮ | ... |
| 3 | R (0 : 1) | B (0 : 5) | ⋮ | ... |
| 2 | Y (0 : 5) | Y (0 : 11) | ⋮ | ... |
| 1 | B (0 : 3) | R (0 : 5) | ⋮ | ... |
| 0 | SYNCHRONIZATION CODE | | | |

FIG. 12

| | | | | | | | | ⋮ |
|---|---|---|---|---|---|---|---|---|
| Y[7:1] | B[7:1] | Y[7:3] | R[7:1] | Y[7:5] | B[7:3] | Y[7:7] | R[7:3] | Y[7:9] B[7:5] |
| Y[6:1] | B[6:1] | Y[6:3] | R[6:1] | Y[6:5] | B[6:3] | Y[6:7] | R[6:3] | Y[6:9] B[6:5] |
| Y[5:1] | B[5:1] | Y[5:3] | R[5:1] | Y[5:5] | B[5:3] | Y[5:7] | R[5:3] | Y[5:9] B[5:5] |
| Y[4:1] | B[4:1] | Y[4:3] | R[4:1] | Y[4:5] | B[4:3] | Y[4:7] | R[4:3] | Y[4:9] B[4:5] |
| Y[3:1] | B[3:1] | Y[3:3] | R[3:1] | Y[3:5] | B[3:3] | Y[3:7] | R[3:3] | Y[3:9] B[3:5] |
| Y[2:1] | B[2:1] | Y[2:3] | R[2:1] | Y[2:5] | B[2:3] | Y[2:7] | R[2:3] | Y[2:9] B[2:5] |
| Y[1:1] | B[1:1] | Y[1:3] | R[1:1] | Y[1:5] | B[1:3] | Y[1:7] | R[1:3] | Y[1:9] B[1:5] |
| Y[0:1] | B[0:1] | Y[0:3] | R[0:1] | Y[0:5] | B[0:3] | Y[0:7] | R[0:3] | Y[0:9] B[0:5] |

TxDATA (7:0)

CODE DIVISION MULTIPLEX COMMUNICATION APPARATUS

BACKGROUND OF THE INVENTION

1. Field of the Invention

The present invention relates to a code division multiplex communication apparatus for transmitting and receiving image data.

2. Description of the Related Art

In the spread-spectrum communication method using the direct spread technique, a baseband signal having a much wider bandwidth than original data is generated from a normal transmitting digital signal by the use of a series of spread codes, such as pseudo noise codes (PN codes) or the like. The resulting signal is further subjected to modulation according to Phase Shift Keying (PSK), Frequency Shift Keying (FSK), or other modulation methods, so as to be converted to a radio frequency (RF) signal. The RF signal is then transmitted. In the receiving end, a de-spread operation is performed by obtaining a correlation between the transmitting signal and a receiving signal by the use of the same spread codes used by the transmitting end. The receiving signal is then converted into a narrower band signal having a bandwidth corresponding to the original data, followed by normal data demodulation performed on the converted receiving signal. The original data is thus reproduced.

As discussed above, in the spread-spectrum communication method, the transmitting bandwidth is much wider than the information bandwidth. Thus, according to this method, when using a fixed transmitting bandwidth, the transmitting speed disadvantageously becomes much lower than by the normal narrower-bandwidth modulation method. Image transmission using such a spread-spectrum method is, in general, performed by the following procedure. That is, an image input from a camcorder is incorporated as a still image into a personal computer and is then output to a spread-spectrum transmitting section via an interface. The image signal is subjected to a spread-spectrum operation in the transmitting section and then sent to a transmission line through an antenna. In the receiving end, the signal received in an antenna is de-spread in a spread-spectrum receiving section and is incorporated as digital data into a personal computer via an interface. Subsequently, the data is converted into an image signal in the personal computer, and the image is then displayed on a monitor.

The transmittable data rate of signals by the above type of spread-spectrum image transmitting apparatus ranges at most from 1 Mbps to 2 Mbps. Therefore, the transmittable image size is restricted to, for example, only one non-compressed full-color image with a 320×240 dots and 24 bits, each RGB having 8 bits, and only one image of the above size can be transmitted per second (1.84 Mbps). At this rate, it is impossible to transmit, for example, even a television image with only a few fields per second. If moving pictures are required to be transmitted, even at this low rate, expensive image compression LSI circuits are further required. This increases the cost of the overall apparatus.

For overcoming the drawback of this low data-transfer rate, the code division multiplex method is available. In this method, high-speed data is converted into low-speed parallel data, and the respective bits of the converted data are spread-spectrum modulated by the use of a series of the different spread codes. The modulated bits of data are added, and the added data is further converted into an RF signal, which is then transmitted. This method enables high-speed data transmission under a condition of a fixed transmitting bandwidth without impairing the spread rate of the spread modulation.

SUMMARY OF THE INVENTION

Accordingly, it is an object of the present invention to provide an apparatus for transmitting and receiving image data by the effective use of a code division multiplex method, and also to provide a code division multiplex method.

It is another object of the present invention to provide a code division multiplex communication apparatus for transmitting and receiving multilevel image data at high speed, and also to provide a code division multiplex communication method.

It is still another object of the present invention to provide an improvement in preserving image quality even in the event of an occurrence of communication errors.

It is a further object of the present invention to provide an improvement in the radio-transmission of moving pictures without requiring the use of an expensive compression/expansion circuit.

A code division multiplex communication apparatus comprises means for providing multilevel pixel data, and allocation means for allocating a plurality of bits of data (corresponding to the multilevel pixel data) to different spread codes. Communication means are provided for spreading the plurality of bits of data by the use of the different spread codes according to the allocation of the allocation means, to provide a code division multiplex signal.

According to another aspect of the present invention, a code division multiplex communication apparatus comprises means for providing a video signal, and digital video signal supplying means for converting the video signal into a digital data string. First storage means are provided for temporarily storing the digital data string output from the digital video signal supplying means, and first write-control signal generating means are provided for generating a timing signal for writing the digital data string into the first storage means. First read-control signal generating means are provided for generating a timing signal for reading the digital data string from the first storage means at a predetermined timing. Transmission means are provided for performing a code division multiplex operation, using a series of spread codes for n-number bits of data, on the respective bits of a parallel data string having a predetermined symbol number n which is read at the predetermined timing from the first storage means by the first read-control signal generating means, thereby transmitting the code division multiplex signal to a transmission line. Receiving means are provided for receiving the signal from the transmission line, and demodulation means are provided for demodulating the n-symbol number of code division multiplex data from the output of said receiving means and the series of spread codes for the n-number bits of data. Second storage means are provided for temporarily storing the n-symbol number of data, and second write-control signal generating means are provided for generating a timing signal for writing the digital data string which is output from the demodulation means into the second storage means. Second read-control signal generating means are provided for generating a timing signal for reading the digital data string from the second storage means at a predetermined timing. Encoding means are provided for encoding the digital data string read from the second storage means into a predetermined video signal.

The transmission means includes a conversion means for converting the digital data string in which a luminance signal and a color difference signal are line-sequential multiplexed, into a parallel data string having a predetermined symbol number of n.

According to yet another aspect of the present invention, a code division multiplex communication method includes the steps of (i) providing multilevel pixel data, (ii) allocating a plurality of bits of data (corresponding to the multilevel pixel data) to different spread codes, and (iii) spreading the plurality of bits of data by the use of the different spread codes according to the allocation of the allocation step, to provide a code division multiplexed signal.

Further objects, features and advantages of the present invention will become apparent from the following description of the preferred embodiments with reference to the attached drawings.

BRIEF DESCRIPTION OF THE DRAWINGS

FIG. 11 is a schematic diagram illustrating the individual spread channels of the different PN codes; and FIG. 12 is a schematic diagram illustrating transmitting data.

DETAILED DESCRIPTION OF THE PREFERRED EMBODIMENT

Figure 1:
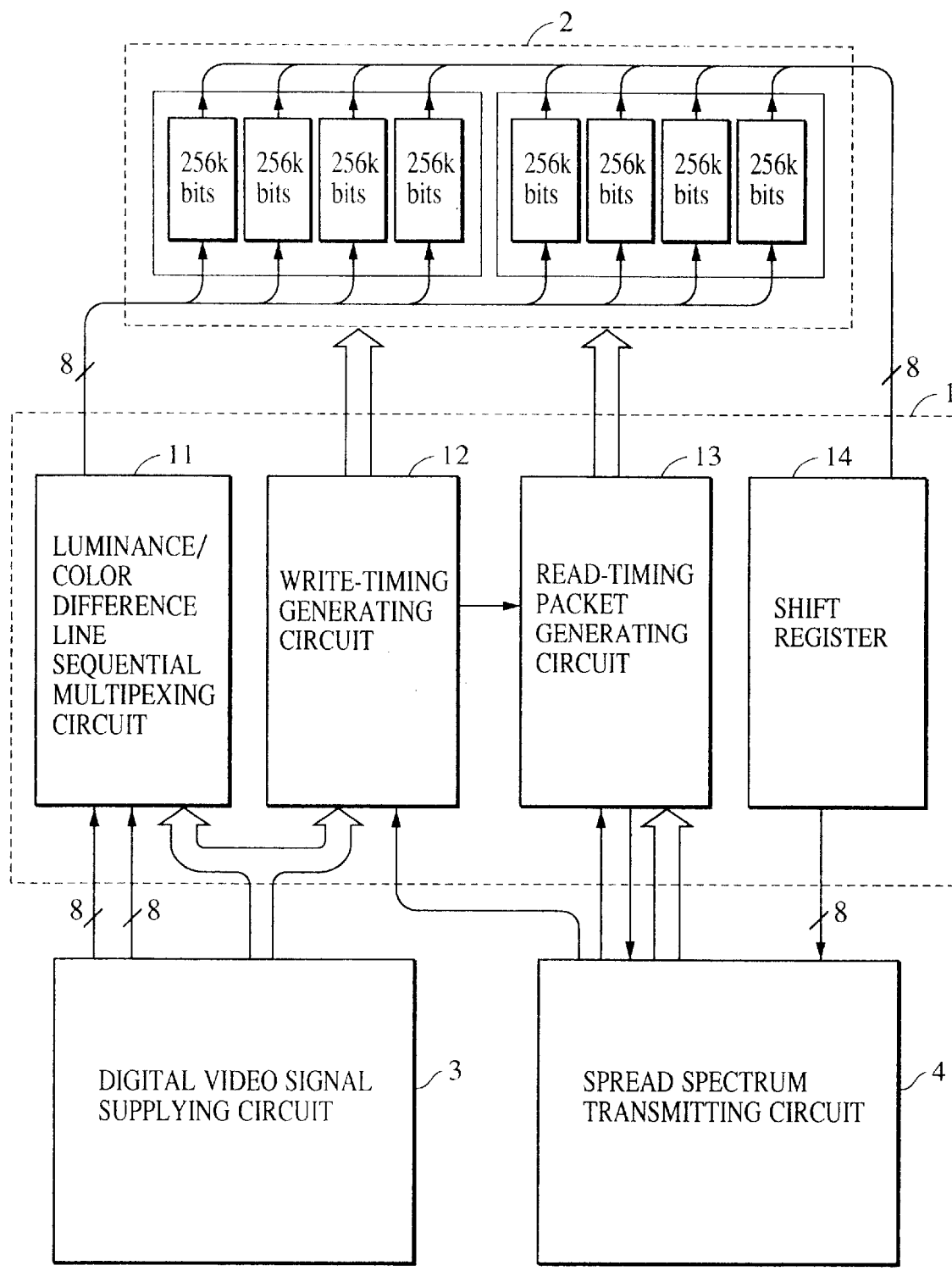
FIG. 1 is a block diagram of a transmitting end, in particular, a memory controller, of a code division multiplex communication apparatus.
Figure 2:
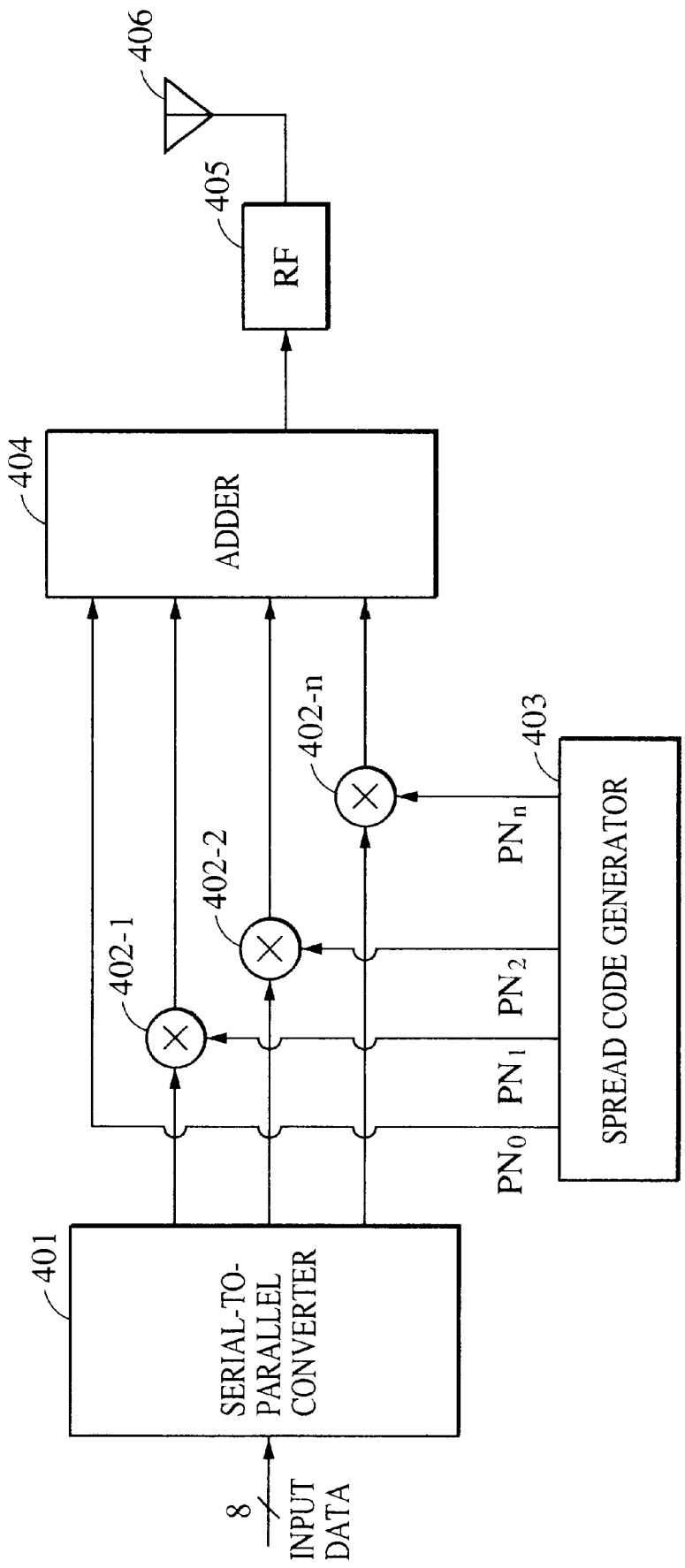
FIG. 2 is a block diagram of a spread-spectrum transmitting circuit.
Figure 6:
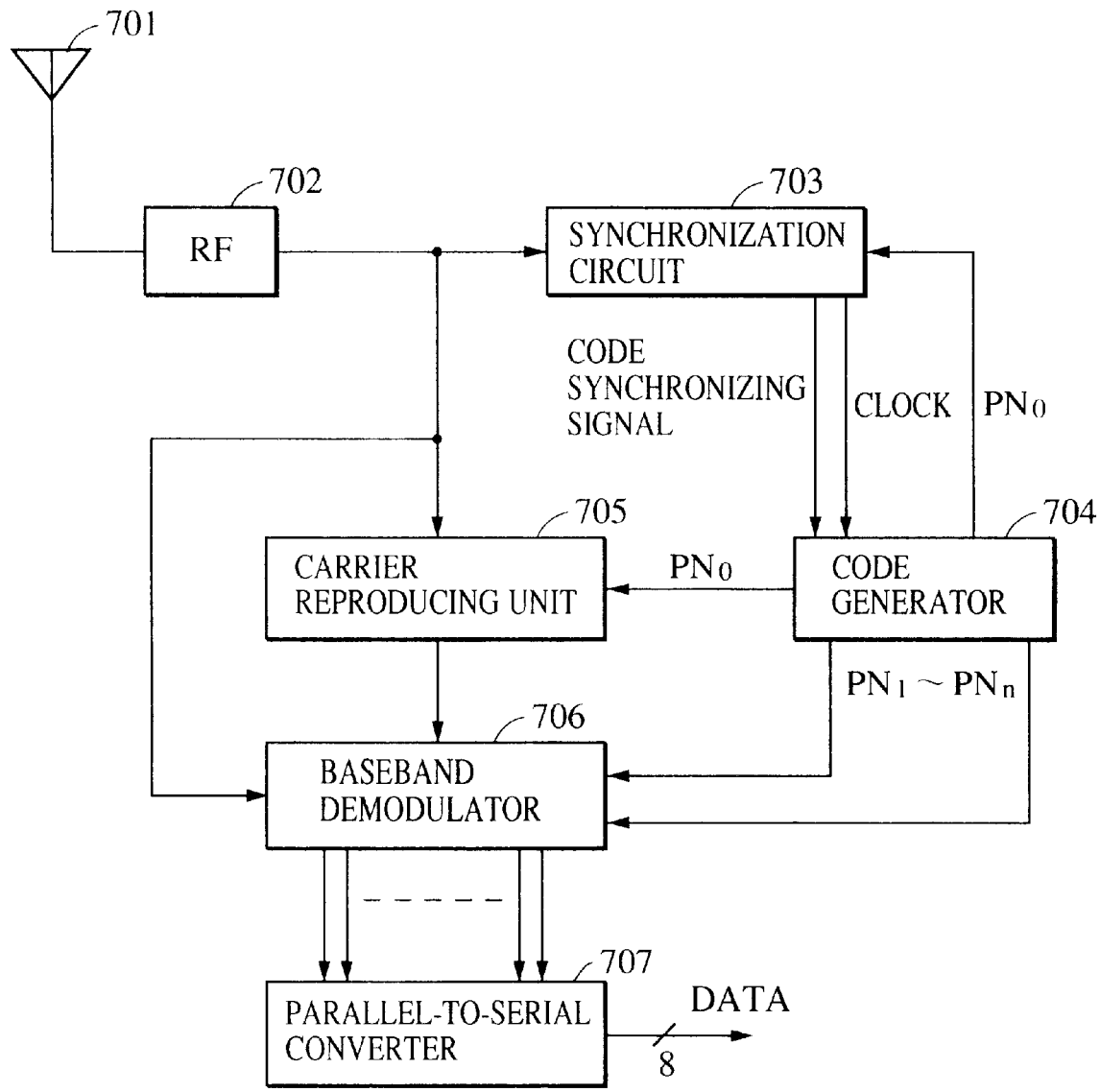
FIG. 6 is a block diagram of a spread-spectrum receiving circuit.
Figure 7:
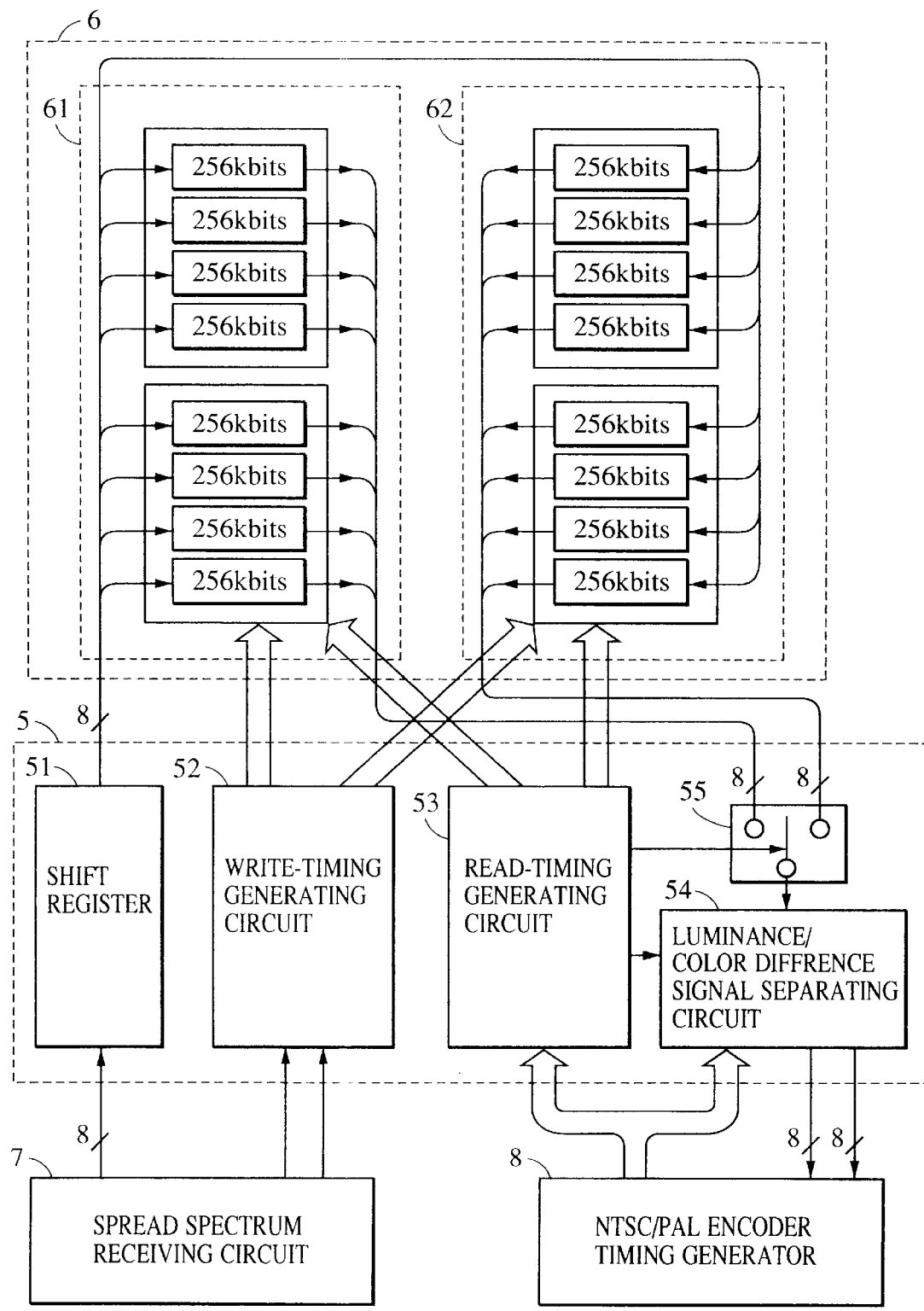
FIG. 7 is a block diagram of a receiving end, in particular, a memory controller, of a code division multiplex communication apparatus.

FIGS. 1, 2, 6 and 7 are block diagrams illustrating a spread-spectrum image transmitting apparatus according to an embodiment of the present invention. FIGS. 1 and 2 illustrate the transmitting end of the apparatus, while FIGS. 6 and 7 show the receiving end of the apparatus.

A reference will first be made to FIG. 1. The spread-spectrum image transmitting apparatus includes an image processing circuit 1, a memory 2, a digital video signal supplying circuit 3, and a spread spectrum transmitting circuit 4. The image processing circuit 1 has a line-sequential multiplexing circuit 11 for sequentially multiplexing luminance signal and color difference signals, a write-timing generating circuit 12 for generating a first write-control signal, a memory 2, a read-timing packet producing circuit 13 for generating a first read-control signal, and a shift register 14.

The spread-spectrum transmitting circuit 4 has, as illustrated in FIG. 2, a serial-to-parallel converter 401, modulators 402-1 through 402-n, a spread code generator 403 for generating a series of spread codes PN1 through PNn for the n number of bits of data and a spread code $PN_0$ used for synchronization, and an adder 404 for linearly adding the n-number of outputs of the modulators 402-1 through 402-n and the synchronization spread code $PN_0$ output from the spread code generator 403. An RF circuit 405 is provided for converting the baseband or the intermediate frequency band signal output from the adder 404 into a predetermined transmitting frequency band signal, and an antenna 406 is provided for transmitting the output of the RF circuit 405 to the transmission line.

A reference will now be made to FIG. 7. There is shown a spread-spectrum receiving circuit 7 for receiving a signal transmitted from the transmitting circuit 4 and reconstructing the receiving signal to a digital data string by performing the de-spread spectrum operation. The receiving circuit 7 comprises, as shown in FIG. 6, an antenna 701; an RF circuit 702 for converting the output of the antenna 701 to a predetermined frequency band signal; a synchronization circuit 703 for extracting from the output of the RF circuit 702 the spread code clock and the code phase synchronizing signal of the transmitting end; a code generator 704, driven by the clock signal and the code phase synchronizing signal output from the synchronization circuit 703, for generating a plurality of spread codes which are the same as the spread codes of the transmitting end; a carrier reproducing unit 705 for reproducing a carrier signal with the use of the predetermined frequency band signal output from the RF circuit 702 and the synchronization spread code PNo output from the code generator 704; a baseband demodulator 706 for demodulating n-symbol data from the predetermined frequency band signal output from the RF circuit 702, the reproduced carrier signal output from the carrier reproducing unit 705, and a series of spread codes PN1 through PNn corresponding to the n-number of bits of data output from the code generator 704; and a parallel-to-serial converter 707 for converting the n-symbol data into a serial digital data string. It should be noted that the spread-spectrum receiving circuit 7 is not restricted to the configuration illustrated in FIG. 6, but may be constructed, as disclosed in U.S. patent application Ser. Nos. 08/233,244 (filing date: Apr. 26, 1994), 8/450,685 (filing date: May 25, 1995), and 08/546,040 (Oct. 20, 1995).

Referring back to FIG. 7, a memory 6, formed of a first memory 61 and a second memory 62, temporarily stores a plurality of serial digital data strings converted by the parallel-to-serial converter 707. An image processing circuit 5 of the receiving end is formed of a shift register 51, a write-timing generating circuit 52 for generating a second write-control signal which produces a timing signal for writing the digital data strings into the memory 6, a read-timing generating circuit 53 for generating a second read-control signal which produces a timing signal for reading the digital data series from the memory 6 at a predetermined timing, a switch 55 for selectively reading a signal from the first memory 61 and the second memory 62, and a luminance/color difference signal separating circuit 54 for separating the line-sequential multiplexed luminance signal and color difference signal. An NTSC/PAL encoder timing generator 8 encodes the digital data separated into the luminance signal and the color difference signal into a predetermined video signal.

Figure 3:
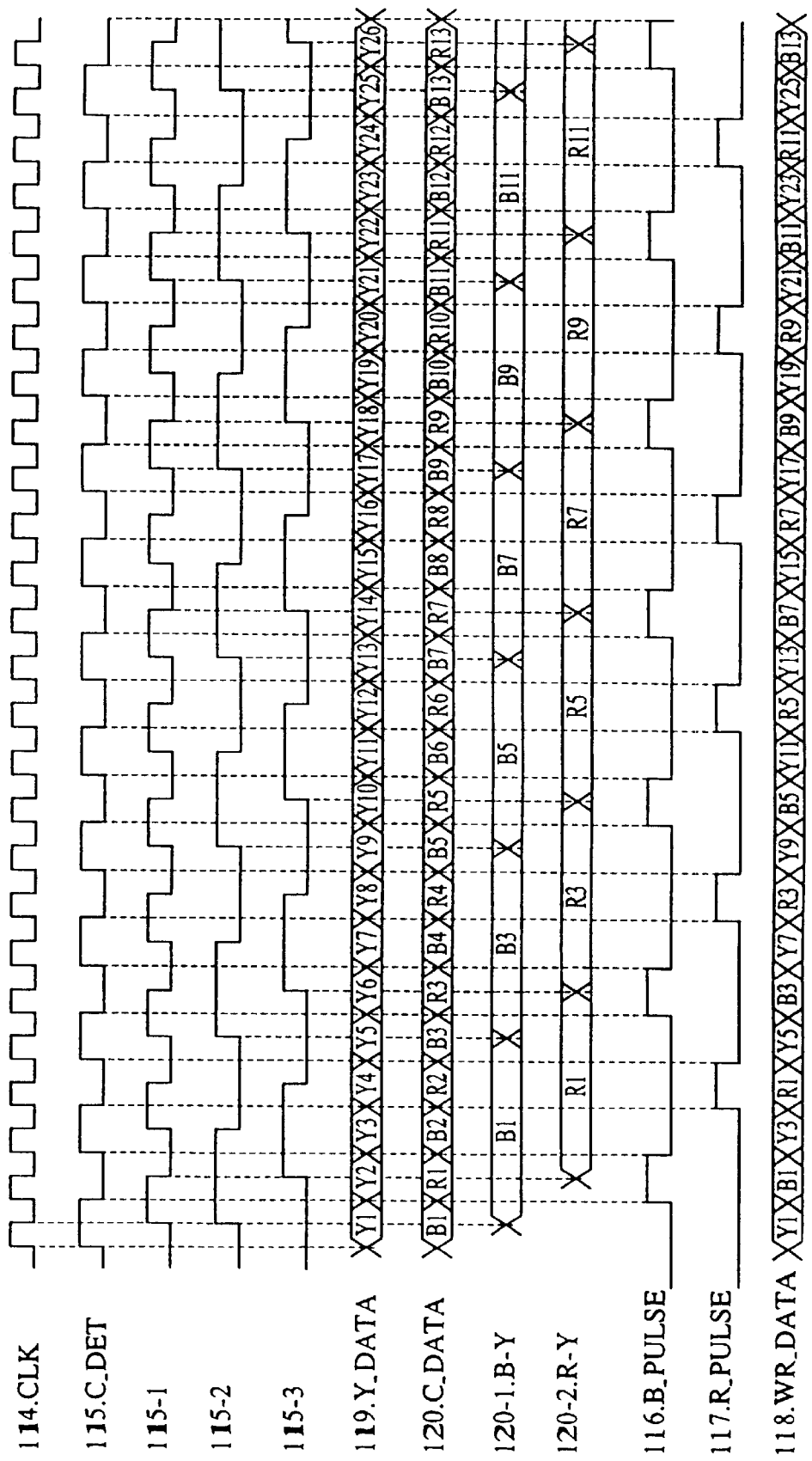
FIG. 3 is a timing chart of a color-signal line-sequential multiplex circuit.

A description will now be given of the operation of this embodiment. FIG. 3 is a timing chart illustrating the process of line-sequential multiplexing the digital luminance/color difference signal output from the digital video signal supplying circuit 3 by the line-sequential multiplex circuit 11.

Figure 4:
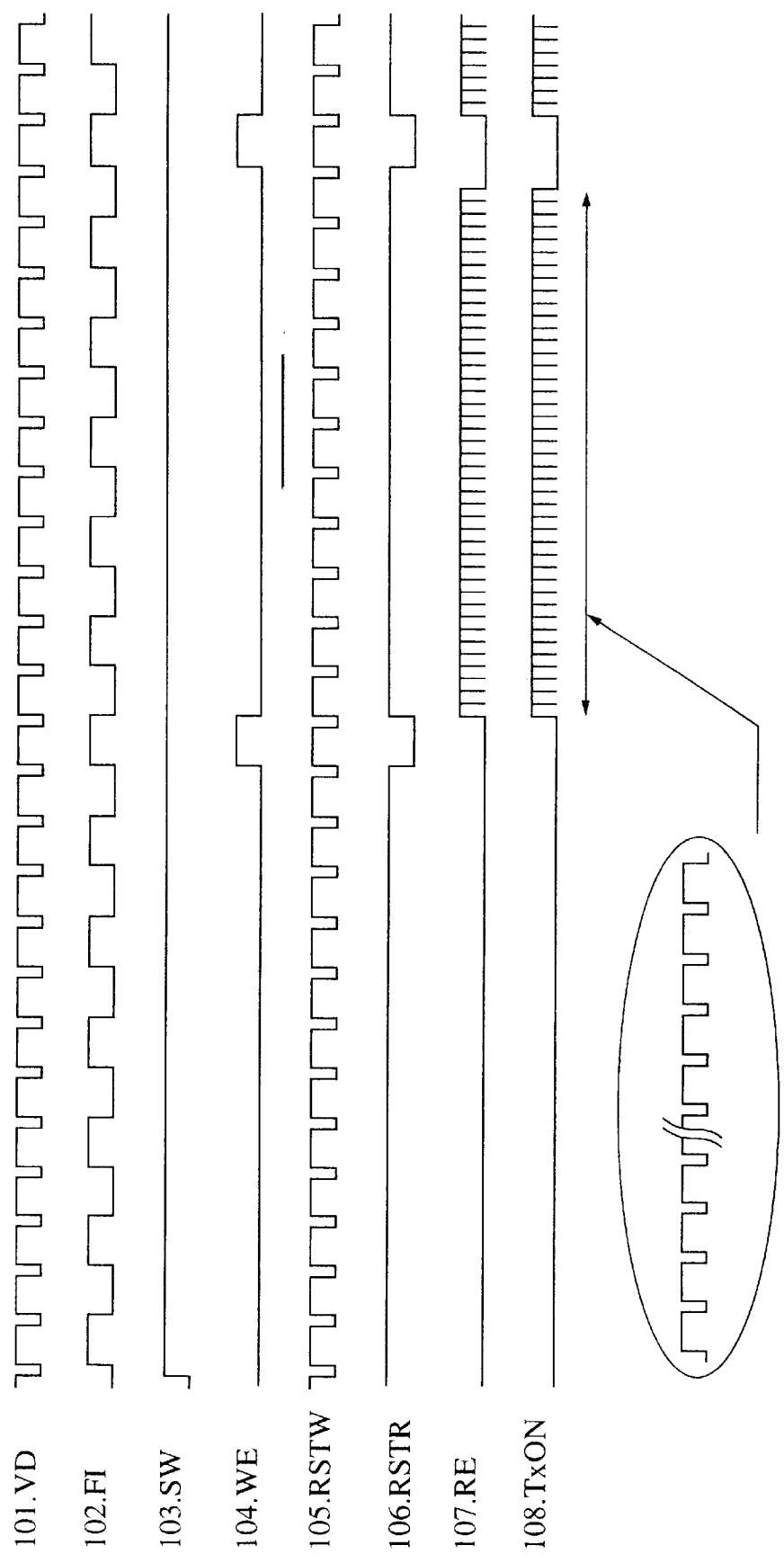
FIG. 4 is a timing chart of transmitting control pulses.
Figure 5:
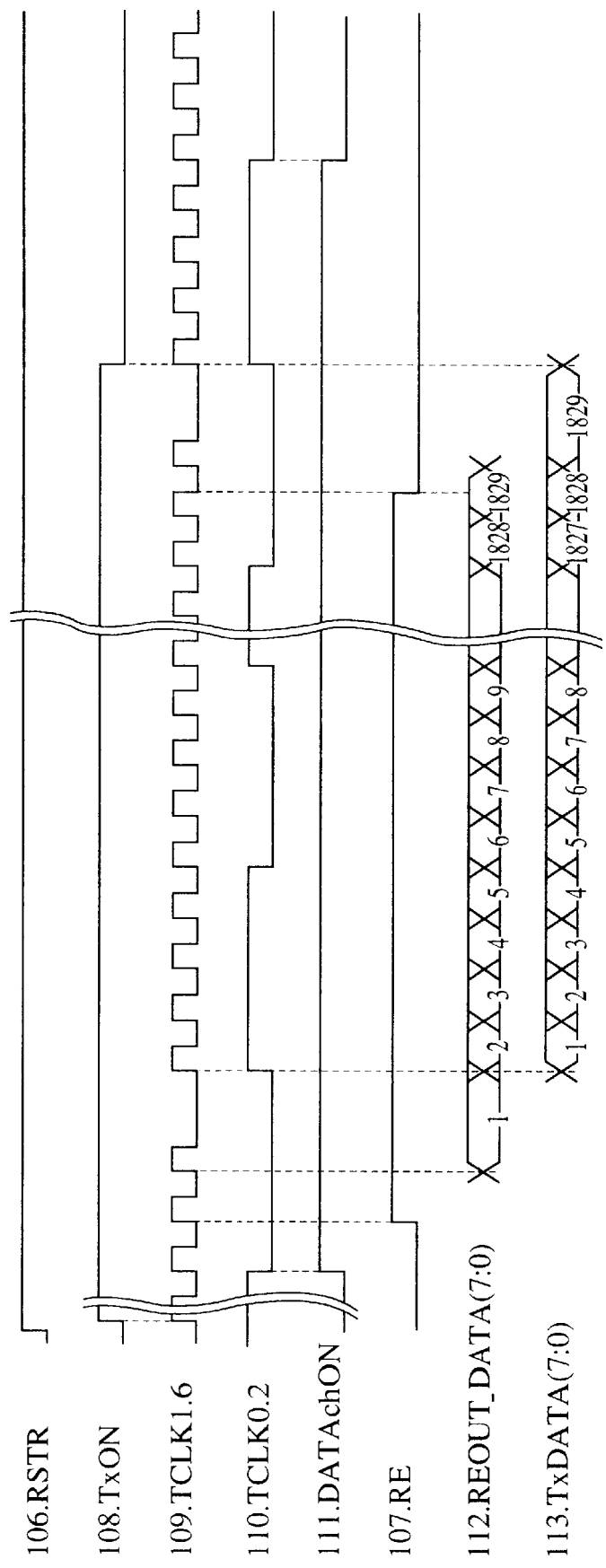
FIG. 5 is a timing chart of transmitting control pulses.

FIG. 4 is a timing chart illustrating the timing of the writing of the signal output from the line-sequential multiplex circuit 11 to the memory 2 by the write-timing generating circuit 12. FIG. 5 is a timing chart illustrating the timing of reading the packet data from the memory 2 by the read-timing packet producing circuit 13 and sending the read data to the spread spectrum transmitting circuit 4.

As illustrated in FIG. 3, supplied to the line-sequential multiplexing circuit 11 from the digital video signal supplying circuit 3 (for example, a camcorder which is capable of outputting digital video signals) are CLK114, C_DET115, Y_DATA119 and C_DATA120. The signals Y_DATA 119 and C_DATA120 are output to the line-sequential multiplexing circuit 11 in synchronization with the CLK114 signal. In this embodiment, the color difference signal 120 is output in such a manner that the signals B-Y120-1 and R-Y120-2 are output while the C_DET115 signal is at the high level and at the low level, respectively. In the interests of simplicity, B-Y and R-Y are indicated by B and R, respectively, in FIG. 3. The pulse produced by delaying the C-DET115 signal in synchronization with the falling edge of the CLK114 signal is represented by 115-1. The pulses formed by scaling down of the frequency of this pulse 115-1 to one half at the rising edge and the falling edge of the pulse 115-1 are designated by 115-2 and 115-3, respectively. The C_DATA120 signal is latched at the rising edges of the respective pulses 115-2 and 115-3, so that B-Y120-1 and R-Y120-2 can be output every other pixel, as illustrated in FIG. 3.

Further, the output of the negative logic of the C_DET115 signal and the multiplier (not shown) of the pulse 115-2 is indicated by B_PULSE116, while the NOR output of the C_DET115 signal and the pulse 115-2 is represented by R_PULSE117. The B-Y120-1, R-Y120-2 and Y_DATA119 signals are added while being switched by a selector (not shown) when the B_PULSE116, R_PUSLE117 and C_DET115 signals are at the high level, thereby outputting the resulting signal WR_DATA118 to be written into the memory 2. In this manner, the line-sequential multiplex circuit 11 converts the digital data, formed of the 8-bit luminance signal and the 8-bit color difference signal, output from the digital video signal supplying circuit 3, into 8-bit digital data by line-sequential multiplexing the luminance/color difference signal while halving the data amount of both the luminance signal and the color difference signal.

Supplied to the write-timing generating circuit 12 from the digital video signal supplying circuit 3 are, as shown in FIG. 4, the synchronizing signals VD101 and FI102, the VD101 signal serving to perform the vertical synchronization of the video signal and the FI102 signal functioning to differentiate the odd fields and the even fields of the video signal. Upon receiving a pulse SW103 from the spread spectrum transmitting circuit 4, the write-timing generating circuit 12 delays the SW103 signal at the rising edge of the FI102 pulse and scales down the frequency of the VD101 signal to one twelfth while the delayed SW103 signal (not shown) is at the high level, thereby generating a pulse WE104 which is at the high level in the even fields every twelve fields. The WE104 pulse, which is an enable signal for permitting the writing of the data into the memory 2, causes the even-field WR_DATA118 signal to be written into the memory 2 every twelve fields.

Moreover, the write-timing generating circuit 12 latches the VD101 signal at the rising edge of the horizontal synchronizing signal (not shown) and the falling edge of the CLK114 pulse so as to produce a write address clear pulse RSTW105 for clearing the write addresses in the memory 2, in synchronization with the WR_DATA118 signal. In this embodiment, the write addresses of the memory 2 are cleared at the rising edge of the RSTW105 pulse. Subsequently, the write-timing generating circuit 12 produces the pulse RSTR106 whose phase is inverted to the WE104 signal as the read address clear pulse for clearing the read addresses in the memory 2. The read addresses of the memory 2 are cleared at the rising edge of the RSTR106 pulse. Namely, immediately after data for one field is written into the memory 2 in response to the WE104 signal, the read addresses are cleared and the reading is promptly started. A pulse RE107, which is an enable signal for permitting the reading of the data from the memory 2, causes the data to be read from the memory 2 while the RE107 signal is at the high level. In this embodiment, each packet is formed of 1829 bytes, and 131 packets are transmitted to the spread spectrum transmitting circuit 4 during one space (one field) of writing the data into the memory 2 every twelve fields. Accordingly, 1829 bytes of one-field data×131 packets are transmitted five times per second, and as a result, the data transmitting rate is 1829×131×8×5=9.6 Mbps.

An explanation will now be given of the timing of the reading of the data from the memory 2 to the spread-spectrum transmitting circuit 4. The output to the read-timing packet producing circuit 13 from the transmitting circuit 4 are, as shown in FIG. 5, TCLK1.6(109) and TCLK0.2(110), both of which are reference clocks asynchronous to the input digital video signal. It should be noted that the TCLK1.6(109) signal for one clock is masked every 32 clocks. The reason will be explained below.

In contrast, upon receiving a transmission request pulse TxON108 from the read-timing packet producing circuit 13, the spread-spectrum transmitting circuit 4 sends a preamble to the receiving end. In response to the receipt of the synchronizing signal by the receiving end, the transmitting circuit 4 further returns a data request pulse DATAchON111 to the read-timing packet producing circuit 13 in synchronization with the falling edge of the TCLK0.2(110) signal subsequent to the TCLK1.6(109) signal. A pulse RE107 is generated within the read-timing packet producing circuit 13 at the timing of a pulse DATAchON111. A signal REOUT_DATA(7:0)112 which is read in accordance with the RE107 pulse is delayed by one clock by the shift register 14 so as to be converted into a signal TxDATA(7:0)113, which is then sent to the transmitting circuit 4.

If the 63-cycle M-series spread codes are used, 62 channels are available for code synchronous multiplex, apart from one channel for synchronization. In this embodiment, serial-to-parallel conversion is performed by the serial-to-parallel converter 401 on the TXDATA (7:0)113 signal input from the shift register 14 at the rate of the TCLK1.6(109) signal in such a manner that the higher seven bits of the first eight data items (Y1 through R3) at the head of a packet and the least significant bit of the first sixth data items (Y1 through B3) are converted to 62 parallel data bits. Namely, 8-bit width data is serial-to-parallel converted into 62-bit width data at the rate of the TCLK0.2(110) signal. In this fashion, since the 62-channel code division multiplex method is employed in this embodiment, a masking period corresponding to one clock of the clock signal TCLK1.6 (109) is set every 32 clocks, and the timing is provided in synchronization with the TCLK1.2(110) signal whose frequency is scaled down to one fourth of the TCLK1.6(109) signal. A detailed explanation of the construction of each spread channel will be given later.

The synchronization spread code $PN_0$ and the 62 different spread codes PN1 through PN62 are generated from the spread code generator 403. The spread codes PN1 through PN62 are multiplied in the multipliers 402-1 through 401-62, respectively by the 62 bits of the parallel data output from the serial-to-parallel converter 401. Then, the synchronization spread code PN0 and the 62 outputs of the multipliers 402-1 through 402-62 are added in the adder 404, and the added output is further converted into a transmitting frequency signal in the RF circuit 405. The frequency is then transmitted from the antenna 406.

In the receiving end shown in FIG. 6, the signal received in the antenna 701 is suitably filtered and amplified, and the resulting signal in the transmitting frequency band is directly output, or the signal is converted into a suitable intermediate frequency band and then output. This signal is input into the synchronization circuit 703 in which spread code synchronization and clock synchronization are provided for the transmitting signal by the use of the reference spread code $PN_0$ input from the code generator 704. Then, the code synchronizing signal and the clock signal are output to the code generator 704 from the synchronization circuit 703. As the synchronization circuit 703, a sliding correlator or a delay locked loop may be employed. The detailed configuration of the synchronization circuit 703 is disclosed in U.S. patent application Ser. Nos. 08/233,244 (filing date: Apr. 26, 1994) and 08/546,040 (filing date: Oct. 20, 1995).

After synchronization is provided for the transmitting signal, the code generator 704 generates a series of spread codes which match the clock and the phase of a series of spread codes of the transmitting end. Among these codes, the synchronization code $PN_0$ is input into the carrier reproducing unit 705 which reproduces, based on the $PN_0$, the carrier wave in the transmitting frequency band or in the intermediate frequency band which is output from the RF circuit 702. The baseband demodulator 706 produces a baseband signal from the above-described reproduced carrier wave and the output of the RF circuit 702. This baseband signal is divided into 62 branches, which are then de-spread by the respective code division channels with the use of a series of spread codes PN1 through PN62 output from the code generator 704, followed by data demodulation. The 62 bits of demodulated parallel data are converted into the 8-bit width serial data by the parallel-to-serial converter 707 and are then output to the shift register 51.

Figure 8:
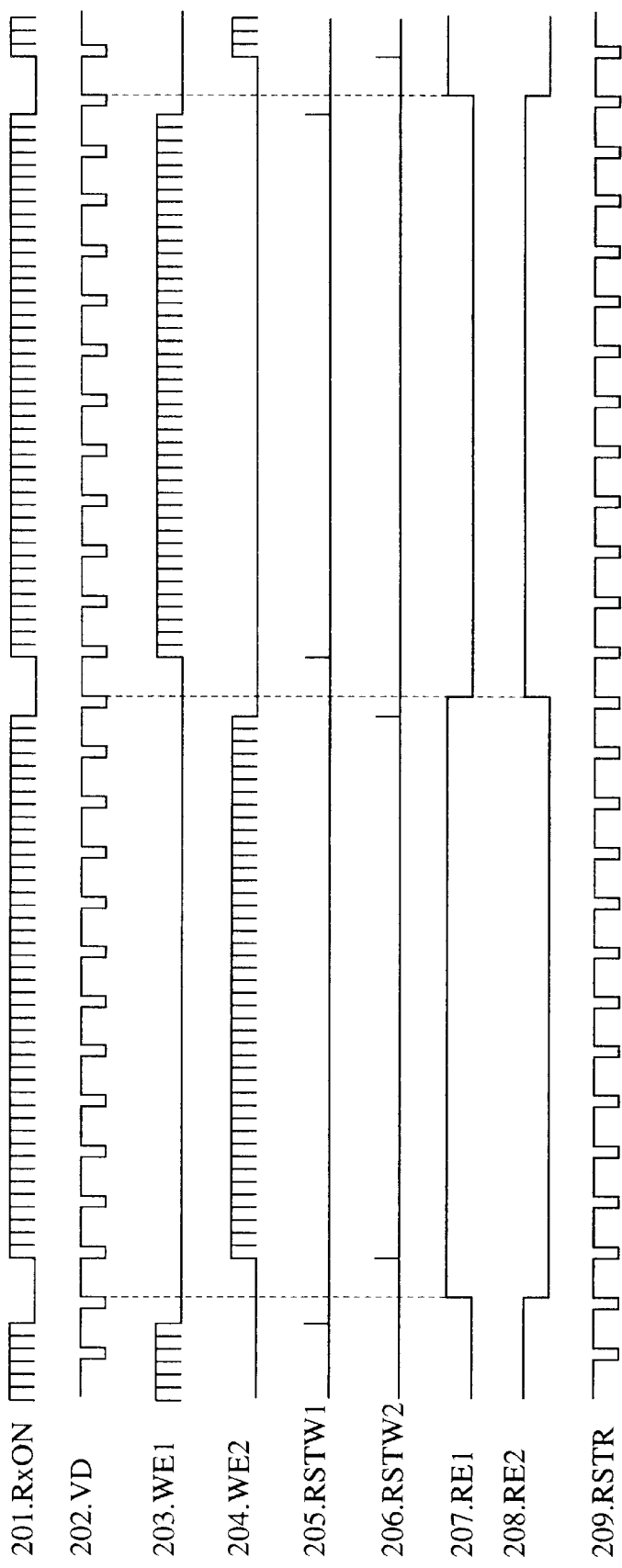
FIG. 8 is a timing chart of receiving control pulses.
Figure 9:
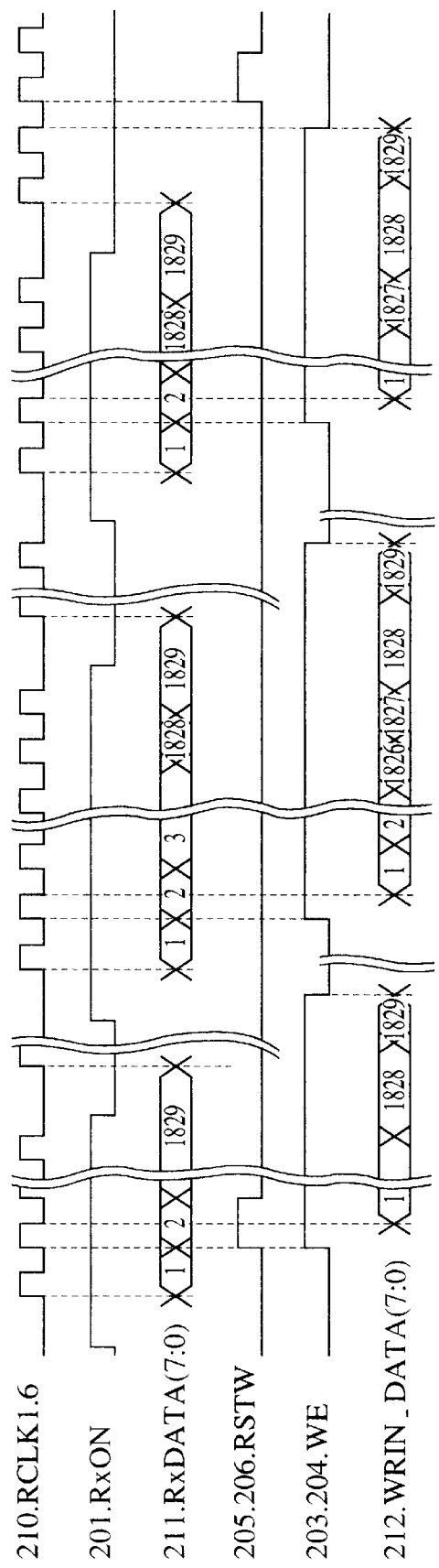
FIG. 9 is a timing chart of receiving control pulses.

The outputs to the write-timing generating circuit 52 from the spread-spectrum receiving circuit 7 shown in FIG. 7 are a receiving synchronous clock signal RCLK1.6(210) shown in FIG. 9 and a pulse RxON201 indicating the receiving-data packet timing illustrated in FIG. 8. The synchronous clock signal RCLK1.6(210) synchronizes the code synchronizing signal generated from the synchronization circuit 703. Additionally, the receiving-data packet timing can be detected by the construction disclosed in U.S. patent application Ser. No. 08/563,792 (filing date: Nov. 28, 1995). An 8-bit width RxDATA(7:0)211 signal is output from the parallel-to-serial converter 707, and the RxDATA(7:0)211 signal is delayed by 1.5 pulses of the RCLK1.6(210) signal in the shift register 51. The resulting signal WRIN_DATA (7:0)212 is then output to the memory 6. The memory 6 formed of the first memory 61 and the second memory 62 is constructed in the following manner: data is read from the first memory 61 while data is written into the second memory 62, and vice versa.

The write-timing generating circuit 52 generates, based on the pulses RxON201 and the RCLK1.6(210) signal, a write enable signal WE1(203) for allowing the data to be written into the first memory 61 and also produces a write address clear pulse RSTW1(205) at the timings illustrated in FIG. 9. The write-timing generating circuit 52 also generates a write enable signal WE2(204) for allowing the data to be written into the second memory 62 and further produces a write address clear pulse RSTW2(206). All of the generated pulses are output to the corresponding first memory and second memory 61 and 62. The write enable signals WE1 (203) and WE2(204) are generated at such a timing in which they can be alternately activated.

The pulse RxON201 is transmitted at a timing in synchronization with the pulse TxON108 generated in the transmitting end. Since a video signal for one field is transmitted in one burst, the memory 6 is switched at every item of data for one field. Further, the write address clear pulse RSTW1(205) for clearing the write addresses in the first memory 61 is output to the memory 6 at both the rising edge and falling edge of the write enable signal WE1(203) at a timing shown in FIGS. 8 and 9. Also, the write address clear pulse RSTW2(206) for clearing the write addresses in the second memory 62 is output to the memory 6 at both the rising edge and falling edge of the write enable signal WE2(204) at a timing illustrated in FIGS. 8 and 9. Upon completion of the writing of all of the 131 packets of data into the first memory 61, a read enable signal RE1(207) is output to the first memory 61 from the read-timing generating circuit 53 at the rising edge of the vertical synchronizing signal VD202. The reading of video signal data from the first memory 61 is thus started.

At the same time, an output to the first memory 61 from the read-timing generating circuit 53 is a read address clear pulse RSTR209 produced by synchronizing the signal VD202 with the rising edge of a horizontal synchronizing signal (not shown) and the falling edge of a signal CLK213. Accordingly, the address of data read from the first memory 61 is updated in synchronization with the VD202 signal which is output to the read-timing generating circuit 53 from the NTSC/PAL encoder timing generator 8.

Thus, the video signal data for one field transmitted from the transmitting end continues to be repeatedly read from the first memory 61 during 12 fields. During the reading of this data from the first memory 61, subsequent field data transmitted from the transmitting end is written into the second memory 62. Then, upon completion of reading the data from the first memory 61, data is started to be read from the second memory 62. In this manner, on the whole, the data output from the first memory 61 and the data output from the second memory 62 are switched by the switch 55 so as to produce continuous digital video signal data. As a consequence, moving images, although they are merely intermittent images, can be transmitted while the images are switched every 12 fields.

Figure 10:
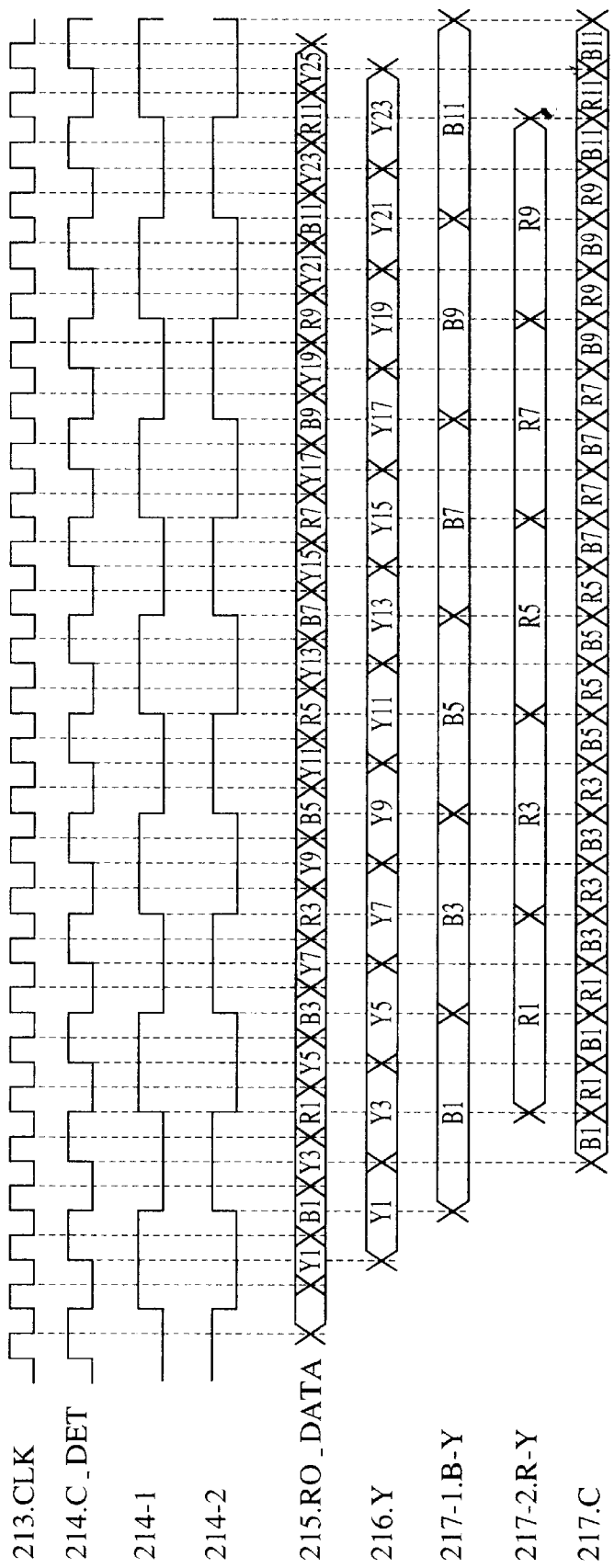
FIG. 10 is a timing chart of the operation of a luminance/color difference signals separating circuit.

An explanation will now be given of separating the luminance signal and the color difference signal from the line-sequential multiplexed luminance/color difference signal in the luminance/color difference signals separating circuit 54. The CLK213 and C_DET214 signals are output, as shown in FIG. 10, from the NTSC/PAL encoder timing generator 8 to the luminance/color difference signal separating circuit 54. The pulse produced by scaling down the frequency of the C_DET214 signal to one half at its falling edge is indicated by 214-1. Further, the pulse formed by inverting the 214-1 signal is represented by 214-2. A signal RO_DATA 215 output from the switch 55 is sampled with the use of the pulses C_DET114, 214-1 and 214-2 so as to generate signals Y216, R-Y217-2 and B-Y217-1, respectively. The signals R-Y217-2 and B-Y2171 are switched by the pulse C_DET214 and are added to generate a signal C217 from which the 8-bit color difference signal is separated from the 8-bit luminance signal. The signal C217 is output to the NTSC/PAL encoder timing generator 8 in which the signal C217 is encoded to an NTSC or PAL signal. The resulting image is further displayed on a monitor (not shown).

If n is determined by an even number, for example, 62, as is employed in this embodiment, the respective spread channels which have been output from the serial-to-parallel converter 401 are divided, as illustrated in FIG. 11, into channels including only luminance signals and channels including only color difference signals. The luminance signals are designated by Y(bit number:data number), while the color difference signals are represented by B(bit-number:data number) and R(bit number:data number). More specifically, FIG. 12 shows that the most significant bits of Y1 through R3 are allocated to the 62nd through the 55th channels; the second bits of Y1 through R3 are allotted to the 54th through the 47th channels; the seventh bits of Y1 through R3 are allocated to the 14th through the 7th channels; and the least significant bits of Y1 through B3 are allotted to the sixth to the first channels. Subsequently, the least significant bits of Y7 and R3 are allocated to the 62nd and the 61st channels; the most significant bits of Y9 through R7 are allotted to the 60th through the 53rd channels; the seventh bits of Y9 through R7 are allocated to the fifth channel; and the least significant bits of Y9 through R5 are allotted to the fourth through the first channels. Further, the least significant bits of Y13 through R7 are allocated to the 62nd through the 59th channels; and the most significant bits of Y17 through R11 are allotted to the 58th through the 51st channels. Likewise, the individual bits are allocated to the corresponding channels. With this arrangement, the elimination of one channel of a color difference signal (odd channel) hardly produces any significant effect on the overall image quality. Accordingly, one channel or a few channels of the color difference signals are substituted with other data by the use of a switch (not shown) provided for the output of the serial-to-parallel converter 401. This makes it possible to transmit data other than video signals. Moreover, when the n indicates an odd number, the individual channels each include both the luminance signal and color difference signals. In this case, even though a specific channel fails to be reproduced at the receiving end, damage to the overall image quality can be reduced to a minimal level.

In this embodiment, image data consisting of 8 bits is allocated to 62 channels. If 127-cycle M-series spread codes are used, data may be allocated to 64 channels. Additionally, in this embodiment one bit of image data is allocated to each channel because binary modulation is used. However, quaternary modulation may be employed, in which case, two bits of image data may be allotted to each channel.

The individual components shown in outline or designated by blocks in the Drawings are well-known in the image processing arts and their specific construction and operation are not critical to the operation or best mode for carrying out the invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A code division multiplex communication apparatus for communicating multilevel pixel data comprising a plurality of bits, the multilevel pixel data including luminance data and color difference data, said apparatus comprising:

allocating means for allocating each bit of the plurality of bits of the multilevel pixel data to a different spread code of a plurality of spread codes in such a manner that one of the plurality of spread codes is allocated to the luminance data at a first timing but allocated to the color difference data at a second timing; and communication means for communicating the multilevel pixel data spread by the plurality of spread codes, wherein the plurality of bits of the multilevel pixel data are code-divided by the plurality of spread codes.

2. A code division multiplex communication apparatus according to claim 1, wherein said allocation means allocates each of the plurality of bits of the multilevel pixel data to a different one of the plurality of spread codes whose number is other than an integral multiple of the plurality of bits of the multilevel pixel data.

3. A code division multiplex communication apparatus according to claim 2, wherein said allocation means allocates each of the plurality of bits of the multilevel pixel data to a different one of the plurality of spread codes in such a manner that the multilevel pixel data which is unable to be communicated at one time by said communication means is communicated twice.

4. A code division multiplex communication apparatus according to claim 1, wherein said allocation means allocates each of a plurality of bits of luminance data of the multilevel pixel data to a different one of a first plurality of codes spreads, and allocates a plurality of bits of color difference data of the multilevel pixel data to a different one of a second plurality of spread codes.

5. A code division multiplex communication apparatus according to claim 1, further comprising:

means for providing a video signal;

digital video signal supplying means for converting the video signal into a digital data string;

first storage means for temporarily storing said digital data string output from said digital video signal supplying means;

first write-control signal generating means for generating a timing signal for writing said digital data string into said first storage means;

first read-control signal generating means for generating a timing signal for reading said digital data string from said first storage means at a predetermined timing;

transmission means for performing a code division multiplex operation, using a series of spread codes for n-number bits of data, on the respective bits of a parallel data string having a predetermined symbol number n which is read at the predetermined timing from said first storage means by said first read-control signal generating means, thereby transmitting the code division multiplexed signal to a transmission line;

receiving means for receiving the signal from the transmission line;

demodulation means for demodulating the n-symbol number of code division multiplexed data from the output of said receiving means and the series of spread codes for the n-number bits of data;

second storage means for temporarily storing the symbol number of data;

second write-control signal generating means for generating a timing signal for writing the digital data string which is output from said demodulation means into said second storage means;

second read-control signal generating means for generating a timing signal for reading the digital data string from said second storage means at a predetermined timing; and encoding means for encoding the digital data string read from said second storage means into a predetermined video signal, wherein said transmission means has conversion means for converting the digital data string in which a luminance signal and a color difference signal are line-sequential multiplexed, into a parallel data string having a predetermined symbol number of n.

6. A code division multiplex communication apparatus according to claim 5, wherein n is an even number.

7. A code division multiplex communication apparatus according to claim 5, wherein n is an odd number.

8. A code division multiplex communication apparatus according to claim 5, wherein said first write-control signal generating means generates the timing signal by scaling down the frequency of a vertical synchronizing signal of a video signal supplied from said digital video signal supplying means in such a manner that some of the digital data strings are removed.

9. A code division multiplex communication apparatus according to claim 5, wherein said second read-control signal generating means generates the timing signal in such a manner that the digital data string for one field is repeatedly read.

10. A code division multiplex communication method for communicating multilevel pixel data comprising a plurality of bits, the multilevel pixel data including luminance data and color difference data, said method comprising the steps of:

allocating each bit of the plurality of bits of the multilevel pixel data to a different spread code of a plurality of spread codes in such a manner that one of the plurality of spread codes is allocated to the luminance data at a first timing but allocated to the color difference data at a second timing; and communicating the multilevel pixel data spread by the plurality of spread codes, wherein the plurality of bits of the multilevel pixel data are code-divided by the plurality of spread codes.

11. A code division multiplex communication method according to claim 10, wherein said allocating step allocates each of a plurality of bits of luminance data of the multilevel pixel data to a different one of a first plurality of spread codes, and allocates a plurality of bits of color difference data of the multilevel pixel data to a different one of a second Plurality of spread codes.

12. A code division multiplex communication method according to claim 10, wherein said allocation step allocates each of the plurality of bits of the multilevel pixel data to a different one of the plurality of spread codes whose number is other than an integral multiple of the plurality of bits of the multilevel pixel data.

13. A code division multiplex communication method according to claim 12, wherein said allocation step allocates each of the plurality of bits of the multilevel pixel data to a different one of the plurality of the spread codes in such a manner that the multilevel pixel data which is unable to be communicated at one time by said communication step is communicated twice.

14. A code division multiplex communication apparatus for communicating luminance data having a plurality of bits and color difference data also having a plurality of bits, said apparatus comprising:

allocation means for allocating each of the plurality of bits of the luminance data and each of the plurality of bits of the color difference data to a corresponding one of a first and a second plurality of spreading codes; and communication means for communicating the luminance data and color difference data spread by the first and second plurality of spreading codes, wherein said communication means communicates the luminance data spread by the first plurality of spread codes and the color difference data spread by the second plurality of spread codes at a first timing, and communicates the luminance data spread by the second plurality of spread codes and the color difference data spread by the first plurality of spread codes at a second timing.

15. A code division multiplex communication method for communicating luminance data having a plurality of bits and color difference data also having a plurality of bits, said method comprising the steps of:

allocating each of the plurality of bits of the luminance data and each of the plurality of bits of the color difference data to a corresponding one of a first and a second plurality of spreading codes; and communicating the luminance data and the color difference data spread by the first and second plurality of spreading codes, wherein in said communicating step the luminance data spread by the first plurality of spread codes and the color difference data spread by the second plurality of spread codes are communicated at a first timing, and the luminance data spread by the second plurality of spread codes and the color difference data spread by the first plurality of spread codes are communicated at a second timing.

16. A code division multiplex communication apparatus for communicating a plurality of image data representing an image, the plurality of image data including characteristic data obtained from the image in accordance with a characteristic of the image, said apparatus comprising:

allocating means for allocating the plurality of image data to a plurality of spreading codes in such a manner that one of the plurality of spreading codes is allocated to the characteristic data and to one of the plurality of image data other than the characteristic data at different timing; and communicating means for communicating the image data code-divided by the plurality of spreading codes allocated by said allocating means.

17. An apparatus according to claim 16, wherein the characteristic data is obtained from the image in accordance with luminance of the image.

18. An apparatus according to claim 16, wherein the image data includes a color difference signal.

19. An apparatus according to claim 16, wherein said allocating means allocates the plurality of image data to the plurality of spreading codes in such a manner that the one of the plurality of spreading codes is allocated to the characteristic data at a predetermined interval.

20. An apparatus according to claim 16, wherein the image data includes luminance data and color difference data, and said allocating means allocates the plurality of image data to the plurality of spreading codes in such a manner that the one of the plurality of spreading code is allocated to the luminance data and the color difference data alternately.

21. An apparatus according to claim 16, wherein each of the plurality of image data consists of plural bits, and said allocating means allocates each bit of the plurality of image data to the plurality of spreading codes.

22. A code division multiplex communication method for communicating a plurality of image data representing an image, the plurality of image data including characteristic data obtained from the image in accordance with a characteristic of the image, said method comprising the steps of:

allocating the plurality of image data to a plurality of spreading codes in such a manner that one of the plurality of spreading codes is allocated to the characteristic data and to one of the plurality of image data other than the characteristic data at different timing; and communicating the image data code-divided by the plurality of spreading codes allocated in said allocating step.

23. A method according to claim 22, wherein the characteristic data is obtained from the image in accordance with luminance of the image.

24. An apparatus according to claim 22, wherein said image data includes a color difference signal.

25. A method according to claim 22, wherein the plurality of image data is allocated in said allocating step to the plurality of spreading codes in such a manner that the one of the plurality of spreading codes is allocated to the characteristic data at a predetermined interval.

26. A method according to claim 22, wherein the image data includes luminance data and color difference data, and the plurality of image data is allocated in said allocating step to the plurality of spreading codes in such a manner that the one of the plurality of spreading codes is allocated to the luminance data and the color difference data alternately.

27. A method according to claim 22, wherein each of the plurality of image data consists of plural bits, and each bit of the plurality of image data is allocated in said allocating step to the plurality of spreading codes.

28. A code division multiplex communication apparatus for communicating color image data including luminance data, said apparatus comprising:

allocating means for allocating the color image data to a plurality of spreading codes in such a manner that one of the plurality of spreading codes is allocated to the luminance data and to one of the plurality of color image data other than the luminance data at different timing; and communicating means for communicating the color image data code-divided by the plurality of spreading codes allocated by said allocating means.

29. An apparatus according to claim 28, wherein the image data includes a color difference signal.

30. An apparatus according to claim 28, wherein said allocating means allocates the plurality of color image data to the plurality of spreading codes in such a manner that the one of the plurality of spreading codes is allocated to the luminance data at a predetermined interval.

31. An apparatus according to claim 28, wherein the color image data includes color difference data, and said allocating means allocates the plurality of color image data to the plurality of spreading codes in such a manner that the one of the plurality of spreading codes is allocated to the luminance data and the color difference data alternately.

32. An apparatus according to claim 28, wherein each of the plurality of color image data consists of plural bits, and said allocating means allocates each bit of the plurality of color image data to the plurality of spreading codes.

33. A code division multiplex communication method for communicating a plurality of color image data including luminance data, said method comprising the steps of:

allocating the plurality of color image data to a plurality of spreading codes in such a manner that one of the plurality of spreading codes is allocated to the luminance data and to one of the plurality of color image data other than the luminance data at different timing; and communicating the color image data code-divided by the plurality of spreading codes allocated in said allocating step.

34. A method according to claim 33, wherein the color image data includes a color difference signal.

35. A method according to claim 33, wherein the plurality of color image data is allocated in said allocating step to the plurality of spreading codes in such a manner that the one of the plurality of spreading codes is allocated to the luminance data at a predetermined interval.

36. A method according to claim 33, wherein the color image data includes color difference data, and the plurality of color image data is allocated in said allocating step to the plurality of spreading codes in such a manner that the one of the plurality of spreading codes is allocated to the luminance data and the color difference data alternately.

37. A method according to claim 33, wherein said each of the plurality of color image data consists of plural bits, and each bit of the plurality of color image data is allocated in said allocating step to the plurality of spreading codes.

* * * * *

UNITED STATES PATENT AND TRADEMARK OFFICE
CERTIFICATE OF CORRECTION

PATENT NO. : 6,128,309

DATED : October 3, 2000

INVENTOR(S): MOTOI TARIKI

Page 1 of 2

It is certified that error appears in the above-identified patent and that said Letters Patent is hereby corrected as shown below:

[57] ABSTRACT:

Line 7, "spreads" should read --spread--.

COLUMN 4:

Line 28, "PNo" should read --$PN_0$--.

COLUMN 10:

Line 33, "codes spreads," should read --spread codes,--.

COLUMN 11:

Line 54, "Plurality" should read --plurality--.

UNITED STATES PATENT AND TRADEMARK OFFICE
CERTIFICATE OF CORRECTION

PATENT NO.    : 6,128,309

DATED         : October 3, 2000

INVENTOR(S)   : MOTOI TARIKI

It is certified that error appears in the above-identified patent and that said Letters Patent is hereby corrected as shown below:

SHEET 1:

Fig. 1, "MULTIPEXING" should read --MULTIPLEXING--.

Signed and Sealed this

Twenty-second Day of May, 2001

Attest:

NICHOLAS P. GODICI

Attesting Officer

Acting Director of the United States Patent and Trademark Office